United States Patent [19]
Smith

[11] 4,453,443
[45] Jun. 12, 1984

[54] PITCH STABILIZED STRING SUSPENSION SYSTEM FOR MUSICAL INSTRUMENTS

[76] Inventor: Paul R. Smith, 33 West St., Annapolis, Md. 21401

[21] Appl. No.: 367,934

[22] Filed: Apr. 13, 1982

[51] Int. Cl.³ .......... G01D 3/04
[52] U.S. Cl. .......... 84/298
[58] Field of Search .......... 84/297, 298, 307, 313, 84/312, 299, 205, 207, 200, 214

[56] References Cited

U.S. PATENT DOCUMENTS

| | | | |
|---|---|---|---|
| 179,903 | 7/1876 | Elliot | 84/205 |
| 544,057 | 2/1896 | Durkee | 84/304 |
| 2,557,877 | 6/1951 | Kluson | 84/306 |
| 2,741,146 | 4/1956 | Fender | 84/313 |
| 3,313,196 | 4/1967 | Mari | 84/297 |
| 4,141,271 | 2/1979 | Mullen | 84/312 P |
| 4,164,806 | 8/1979 | Stone et al. | 84/297 S X |
| 4,171,661 | 10/1979 | Rose | 84/313 |
| 4,281,576 | 8/1981 | Fender | 84/298 |
| 4,385,543 | 5/1983 | Shaw et al. | 84/298 |

*Primary Examiner*—Donald A. Griffin
*Attorney, Agent, or Firm*—Barnes & Thornburg

[57] ABSTRACT

A pitch stabilized string suspension system which eliminates the detuning while playing by designing the string length between the string break point and the string attachment point as a function of the coefficient of friction and the deflection angle at the break point. Novel designs of the components of the string suspension system, the bridge, the saddle, the nut, and the tuning machine are also disclosed.

67 Claims, 12 Drawing Figures

PITCH STABILIZED STRING SUSPENSION SYSTEM FOR MUSICAL INSTRUMENTS

BACKGROUND OF THE INVENTION

This invention relates to musical instruments, to guitars, and more specifically to guitars equipped with a tremolo device for dynamically altering the pitch of the instrument.

There are many tremolo devices of many different configurations known to those skilled in the musical instruments arts. All tremolo devices, except that designed and patented by Floyd Rose, U.S. Pat. No. 4,171,661, have the common fault that use of the tremolo device or even merely playing the instrument with a tremolo device will alter the pitch of said instrument.

The Floyd Rose patent, U.S. Pat. No. 4,171,661, describes a technique for fixing the pitch of the instrument by clamping the strings at the bridge and the nut at the end of the neck. These clamps produce a large friction force between the guitar and the strings. Although the Rose design is effective in maintaining the pitch of the instrument, it requires a complex tuning procedure of loosing clamps at the nut, retuning, and reclamping.

There are many tuning peg designs. Of particular note are designs patented by G. B. Durkee, U.S. Pat. No. 554,057, and Kluson, U.S. Pat. No. 2,557,877. Both of these patents disclose means for attaching or clamping the string to the tuning peg shaft. Another tuning device which clamps the string is presented by Mullen, U.S. Pat. No. 4,141,271. This device undesirably requires tools to operate because the spacing between tuning members is very small.

There are also many tremolo bridge designs. The most notable was patented by C. L. Fender, U.S. Pat. No. 2,741,146. Although this design has an excellent tremolo sound and operational feel, the bridge does permit the instrument to go out of tune for many reasons. The pivoting means prohibits the bridge from returning to its exact original location, the bridge saddles move and alter the pitch of the instrument, and the saddles present a significant medium friction force on the string which also can alter said pitch.

The definition of a medium friction force is one which is large enough to impede noticeably the motion of the string but insufficient to halt the motion of the string in all situations. A high friction force is then one which is sufficient to stop motion under all conditions, such a friction is produced by a clamp. Conversely, a low friction force is one which does not noticeably affect the motion.

There are many adjustable bridge patents in the art, for example two by C. L. Fender, U.S. Pat. Nos. 2,741,146 and 4,281,576. These bridge disclosures describe bridges which permit independent height and intonation adjustment of every string. Practical experience has shown that this flexibility is not necessarily needed with proper string sizing and bridge design.

Practical experience also has shown that bridges generally are not sufficiently stiff and are not stable. The lack of rigidity detrimentally affects the sound and sustain of the instrument. The instability in the string adjustments generally requires complex readjustment too frequently.

Additionally there are patents which incorporate rollers to minimize the friction between the string and the contact. An example of this art is Mullen, U.S. Pat. No. 4,141,271. However, the roller presented by Mullen is simply mounted on a shaft and is subject to being driven along the shaft. Any side motion detrimentally affects the sustain and sound of the instrument.

Furthermore, there are a number of techniques in the art for attaching a bead on the bridge end of the string for simple attachment to the instrument. Examples of this art are D. L. Mari, U.S. Pat. No. 3,313,196 and W. N. Stone, et al., U.S. Pat. No. 4,164,806.

OBJECTS OF THE INVENTION

The broad object of the invention is a string suspension system for a musical instrument which keeps said instrument in the desired tune throughout extended, abusive play and which requires no tools to tune or restring.

An object of this invention is to set the design criteria for a pitch-stable instrument.

An object of this invention is to support the string so that the variation in string forces is minimized.

An object of this invention is a tremolo bridge design which minimizes the associated detuning effects.

An object of this invention is an adjustable bridge which incorporates a minimum number of parts and presents no protrusions to catch on or interfere with the instrument player's hands, arms, or clothing.

An object of the invention is a bead attachment method for minimizing or eliminating the common practice of attaching the string to the bead by wrapping the string around the bead and then around itself.

An object of this invention is a low-friction nut combined with a tuning peg equipped with a string clamping means and a string attachment method which minimizes the wrap of the string around the tuning peg.

An object of this invention is an alternative tuning adjustment means which provides a moveable attachment point close to the nut.

A further object of this invention is a bridge design which is simpler to build and sounds better than prior art compensated bridges because the design is inherently stiffer, is more stable, and provides adequate adjustment for properly gauged strings.

SUMMARY OF THE INVENTION

The present invention is a system of string support means which are dimensionally related to minimize the detuning effects of tremolo arm operation. A mathematical expression relates the various lengths of string between string attachment points, and string attachment points to string break points with the coefficients of friction at the break points and the sine of one-half the deflection angle at the string break points.

The present invention extrapolates this expression to a design philosophy which avoids medium friction contact with the string or if such a situation is unavoidable to minimize the length of string that the medium friction affects. Good string pitch stability can be achieved if the length of string which the medium friction affects is kept to less than four percent of the total string length or less that one inch.

This invention describes elements of the string support system which make the aforementioned mathematical expression possible. There are three bridge designs which allow medium friction string contact, but which minimize the affected string length. There is a tuning means and roller nut which permits long affected string lengths and minimizes the friction. To complete the possibilities, there are roller bridges and medium friction nuts.

This invention also details the structure of a new form of bridge which minimizes the number of parts, yet provides adequate adjustment capability if the proper sized strings are used on the instrument.

This invention also details specific combinations of these string suspension elements to create a complete stringed instrument. An important combination is one with a string deflection angle at the nut of a maximum 10 degrees which then allows for a more standard nut with a medium friction.

AN OVERVIEW OF A STRINGED INSTRUMENT

Figure 1:
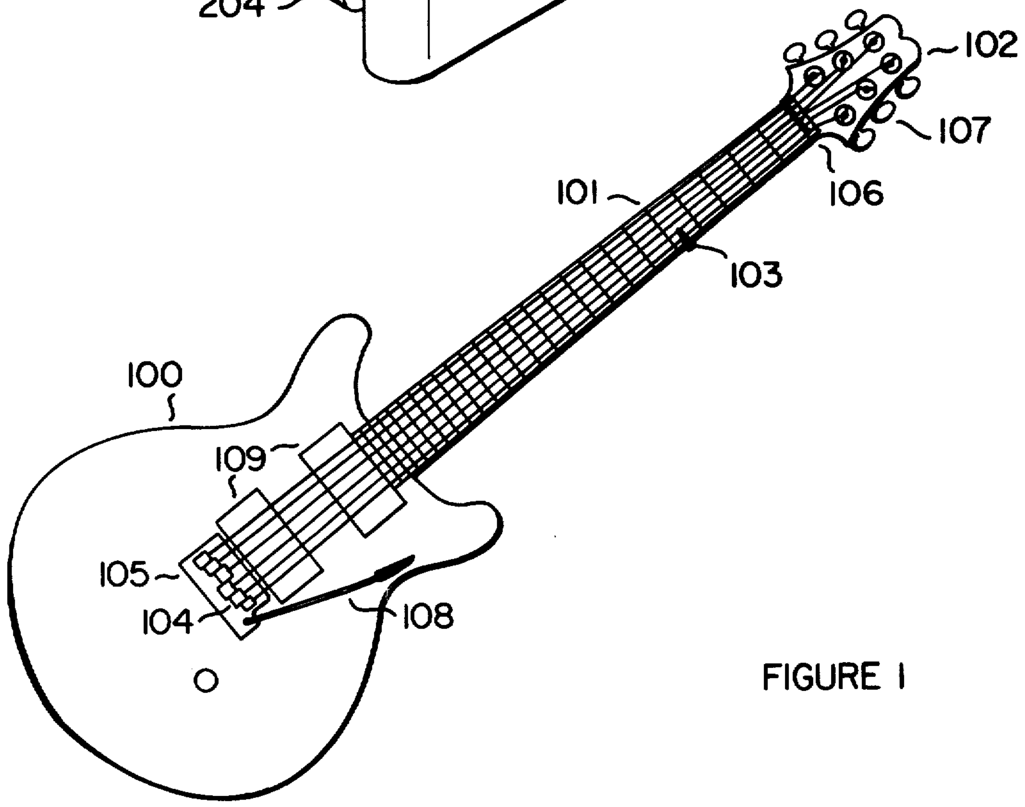
FIG. 1 is an overall view of the Paul Reed Smith tremolo guitar.

The Paul Reed Smith guitar is pictured in FIG. 1 to illustrate the important components of this stringed instrument. The structure of the instrument is a solid body 100, a truss-rod compensated neck 101, and a head 102. The strings 103 which are preferably terminated in a crimped bead are hooked on saddles 104. The saddles are connected to the bridge 105 which in turn is connected to the body 100. The strings are stretched from their connection points and string break points on the saddles 104 over the neck 101, over the roller nut 106, and to the tuning pegs 107. The tremolo arm 108 moves the bridge 105 to alter the pitch of the strings 103. The electro-magnetic pickups 109 sense the vibrations of the strings and convert said vibrations to an electric signal which is then amplified to sufficient intensity.

The body 100, the neck 101, and the head 102 combine to form the support structure for the strings and the various components which support the strings. The string suspension system consists of the bridge 104, the saddles 105, the nut 106, and the tuning pegs 107.

This stringed instrument incorporates a string suspension system which, unlike other stringed instruments in the art maintains pitch despite the use of the tremolo bar 108 and despite certain forms of string-stretching playing techniques. All of the components of the string suspension system have been altered in novel ways to reduce the friction at the nut and the saddle string break point and to reduce the effects of said friction to achieve pitch stability.

PITCH STABILITY ANALYSIS

The effect on pitch stability of the friction at a string break point at the saddle or the nut can be evaluated with the aid of a simplified model of the instrument. Consider a string that is fixed at a first end, traverses a break point, and is again fixed at a second end. Furthermore consider this string to be stretched to produce a frequency of W radians per second. Let the distance from the first end to the break point be XB and let the distance of the break point to the second end be XV. Let XV be the portion of interest for producing said tone of W radians per second. Then the force F in the string is $$F=W^{**}2^*d^*A^*XV^{**}2$$

where d is the string mass density

A is the cross sectional area of the string is an exponential operator, W2=W*W

The relaxed length of the string can then be calculated from a form of the elasticity equation:

$$LV=XV^*A^*E/(A^*E+F)$$

$$LB=XB^*A^*E/(A^*E+F)$$

where

LV is the relaxed length of the segment XV

LB is the relaxed length of the segment XB

E is the modulus of elasticity for the string

The total relaxed string length LT, $LT=LV+LB$, is a constant once the instrument is tuned because the string is fixed at each end.

The break point produces a friction force, f, on the string when it is moved by using a tremolo device or by stretching the string in certain forms of instrument usage. This force f redistributes the string across the break point and alters the force in the string segment XV consequently altering the pitch of the string. This effect of this force can now be approximated by the following force analysis taken at the break point.

$$FB+f=FV$$

where

FB is the force in the XB segment

FV is the force in the XV segment they by appropriate substitution in the equation $$LT=B+V$$

where lB is the relaxed length of XB with f lV is the relaxed length of XV with f one obtains $$LT=XV^*A^*E/(A^*E+FV)+XB^*A^*E/(A^*E^*FV-f)$$

then by taking the derivative of FV with respect to f and evaluating the derivative at f=0.

$$dFV/df=XB/(XB+XV)$$

The sum of XB and XV is the total distance between the attachment points. The force FV can now be approximated by $$FV=F+f^*(dFV/df)$$

This value can now be used to find the new frequency as a result of the friction force f. Conversely, the frequency error limitation can pose a limit to the change in the force F. Demanding musicians will accept a maximum change in pitch of 1.5%, but prefer a smaller or zero change in pitch. The 1.5% maximum pitch change corresponds to a force change of approximately 3%. Thus the force change, (FV−F)/F, must be less than 3% or $$0.03>(f/F)^*(dFV/df)=(f/F)^*(XB/(XB+XV))$$

The term XB/(XV+XB) in the above inequality is very important. It says that if the distance from a fixed point to the string break point is short then the above inequality will be easier to achieve because this term will then have a smaller value. In particular, if XB is less than 4% of XV, then this inequality is nearly met under most deflection angles and friction conditions. However, smaller percentages are better.

The term f/F in the above inequality is also quite important and can be determined from the physics of the break point. The string breaks across the break point with an deflection angle of twice T. Then the force against the break point, ff is $$ff=2^*F^*\ \mathrm{SIN}\ (T)$$

and since $$f=U^*ff$$

$$f/F=2^*U^*\ \mathrm{SIN}\ (T)$$

where U is the coefficient of friction.

There are a number of methods of creating a break point. The standard technique is to provide a slot in which the string slides. Sliding friction varies considerably with materials. Obviously harder, slicker materials are best. Alternatively, the instrument may be provided rolling break points to reduce the friction considerably. This friction is also an ill defined value since it depends upon the type of bearings used in the roller and the surface of the shaft the bearings operate on. There is also a point to made against bending the string too sharply around a break point for this demands a constant bending of the string which requires additional forces not included in the above analysis.

Additionally, the term f/F can be kept small if SIN (T) is small. However, there is a limitation. The string cannot be permitted to lose contact with the break point. Of course, if it should lose contact the string pitch will immediately lower because it is then vibrating over a longer distance. Additionally, the string will buzz on the contact point and will produce a definitely unmusical sound.

Stringed instruments are equipped with two string breaking points, one at the nut and one at the saddle. The above analysis above can be extended to consider two break points by noting that the total relaxed string length once tuned is constant, i.e.

$$LT=LB+LV+LN$$

where

- LB is the string length from the bridge attachment to the saddle break point
- LV is the string length between break points
- LN is the string length from the nut to the tuning peg.

By assuming two break point forces, fB and fN, and by making the appropriate substitutions, the partial derivatives may be found and evaluated at fB=0 and fN=0. The force in the vibrating section of the string FV is then approximately where p is the partial derivative operator $$FV=F+fB^*pFV/pfB+fN^*pFV/pfN$$

Then by substitution and by applying the pitch stability criteria $$0.03>2^*UB^*XB^*\ \mathrm{SIN}\ (TB)/XT+2^*UN^*XN^*\ \mathrm{SIN}\ (TN)$$

or $$0.015^*XT>UB^*XB^*\ \mathrm{SIN}\ (TB)+UN^*XN^*\ \mathrm{SIN}\ (TN)$$

where

- XT is the string length from the bridge attachment point to the tuning peg
- UB is the coefficient of friction at the bridge or saddle break point
- XB is the string length from the bridge attachment to the bridge or saddle break point
- TB is one-half of the string deflection angle at the bridge or saddle
- UN is the coefficient of friction at the nut
- XN is the string length between the nut and the tuning device or head attachment point
- TN is one-half of the string deflection angle at the nut Note that the definition of the coefficient of friction must be broad enough to cover rolling friction as well. Thus, the coefficient of friction is force needed to move the string over a break point divided by the force of the string against the break point.

To summarize this analysis, the most stable instrument design locates the string attachment point very close to the break point, creates a break point with a very low friction against the string, and minimizes the string deflection angle at the saddle and the nut. Of course, the design must consider many other practical considerations. The resulting design tradeoffs either decrease the pitch stability of the instrument, increase the complexity of the instrument, or require different approaches to the guitar string suspension structure.

THE FIRST EMBODIMENT OF A TREMOLO BRIDGE

Figure 2B:
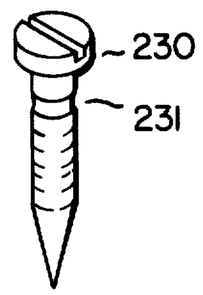
FIG. 2B is a modified screw used as one member of a knife edge.
Figure 2A:
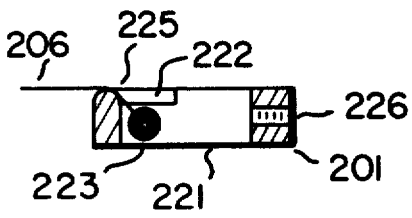
FIG. 2A is the cross sectional view of the saddle for the above bridge.
Figure 2:
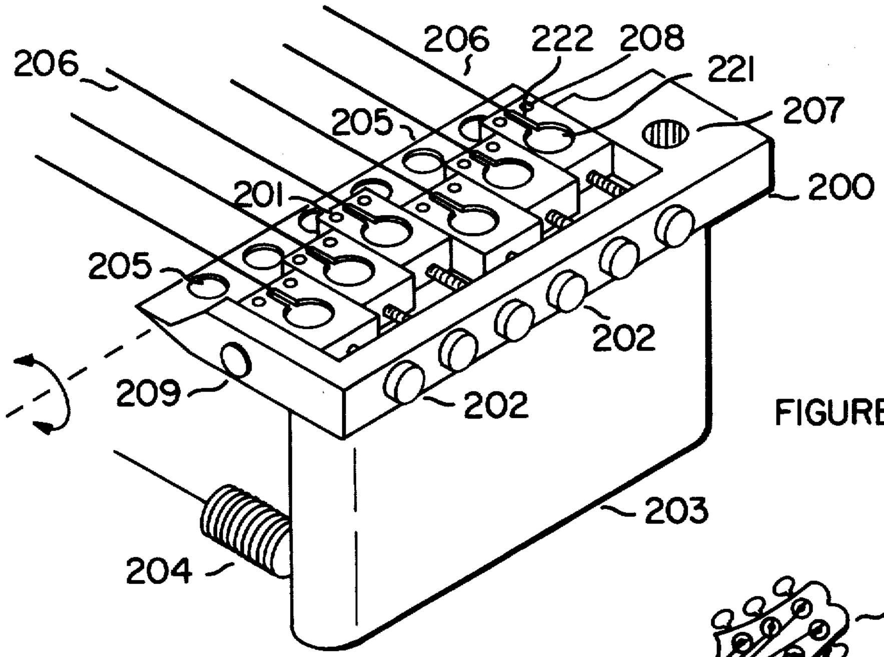
FIG. 2 is a perspective view of the first embodiment of a pocket type tremolo bridge.

The first embodiment of the tremolo bridge assembly is shown in FIG. 2. The primary feature of this bridge is the combination of the string attachment means with the adjustable saddle. This minimizes the length of string from the attachment to the saddle string break point. The saddles are designed with a pocket and a slot to receive the bead end of a string to facilitate the securing of the string at the bridge. The string is secured by passing the attached bead through the pocket and pulling the string into a slot which is narrower than the bead. The bead cannot then be pulled through the slot and the string is then reliably secured. The end of the slot is formed into a string break point, thus the length of string between the break point and the attachment point is very short, less than one-quarter inch.

The bridge assembly consists of a bridge base plate 200, a plurality of saddles 201, a plurality of lateral adjustment screws 202, a lever 203, and a plurality of counter tension springs 204. The base plate 200 is attached to the body 100 of the instrument in a manner well known to the tremolo guitar art by screws through a plurality of holes 205. The screws are not tightened as one would normally perform an attachment, but permit the base plate to pivot around the screws in the holes 205 in the manner shown by the arrow. The plurality of saddles 201 are located in a cavity in said base plate. Each saddle is designed to receive a musical string 206 which has been terminated with a bead in one of the many techniques which do not wind the string back on itself. The tension in said strings is transmitted through the saddles 201, through the lateral adjustment screws 202 to the base plate 200. The tension force is countered by the lever 203 and the plurality of counter tension springs 204 which are connected between said lever and the body 100. Since the springs are oriented parallel to the strings, the plurality of screws through holes 205 must withstand the combined tension of the strings 206 and of the springs 204. The hole 207 is designed to receive the tremolo bar that the instrument player uses to change the pitch of the instrument by rotating the bridge in the manner shown by the arrow.

The saddle is designed to be fully adjustable in height above the bridge base plate as well as the lateral position along the length of the string. The lateral position of a saddle is adjusted by rotating the corresponding lateral adjustment screw 202. The height of the saddle is adjusted with set screw in threaded holes 208 which preferably number two per saddle.

FIG. 2A illustrates the novel string-capturing technique which advantageously keeps the string between the attachment and the break point very short. The body of the saddle 201 has a hole 221 and a slot 222 in it. Part of the slot is larger to accomodate the bead termination 223 of the string 206 as shown in the cross sectional view. The end of slot is formed into a string break point 225 as shown in both views. Finally, the threaded hole 226 is for a lateral adjustment screw 202 while the threaded holes 208 are for height adjustment screws which are not shown.

The string 206 is affixed to the saddle and hence to the bridge by inserting the bead 223 into the hole 221 and sliding string along the slot so that the bead 223 is positioned as shown in the cross sectional view of FIG. 2A. The string is then stretched across the breaking point 225 up the neck to the nut and the tuning peg of the instrument.

FIG. 2B shows an improved screw 230 which has been modified with a slot or relief 231. This slot is designed to receive the edge of holes 205. This edge preferably is made sharp by countersinking them. The combination of slots and sharp edged holes produces a knife edge hinge which, of course, operates quite freely. A further advantage in the slot-modified screws is that the height and angle of the bridge with respect to the body can be adjusted.

Although the guitar art has always used threaded holes to attach the tremolo arms, a better, more durable technique is to simply use a straight reamed hole which provides a sliding engagement. If the friction between the arm and the hole is not sufficient to keep the tremolo arm from rotating freely, additional friction can be created by a spring loaded ball in the same manner that a spring loaded ball presses against the handle of the common thread tap handle to keep the handle from sliding freely.

Although the elegant, precision technique to keep the saddles 201 from moving in the cavity of the bridge base plate 200 is to make them fit very closely, a less precise alternative is a clamping screw 209. This screw presses all of the saddles towards the opposite side of the cavity and then keeps the saddles from moving in response to the motion of strings 206.

AN EMBODIMENT OF A NON-TREMOLO BRIDGE

Although the tremolo instrument primarily shows pitch instability, the non-tremolo instrument can also show pitch instability in certain forms of play which also stretch and release the strings; consequently, the same stability analysis and construction apply. The bridge illustrated in FIG. 3 has a slightly longer distance from the string attachment point to the saddle break point than the bridge disclosed with FIG. 2, but this distance is still well within the 4% figure provided by the analysis hereinabove. Additionally, this bridge features a smaller deflection angle and a simpler construction involving fewer parts.

Figure 3:
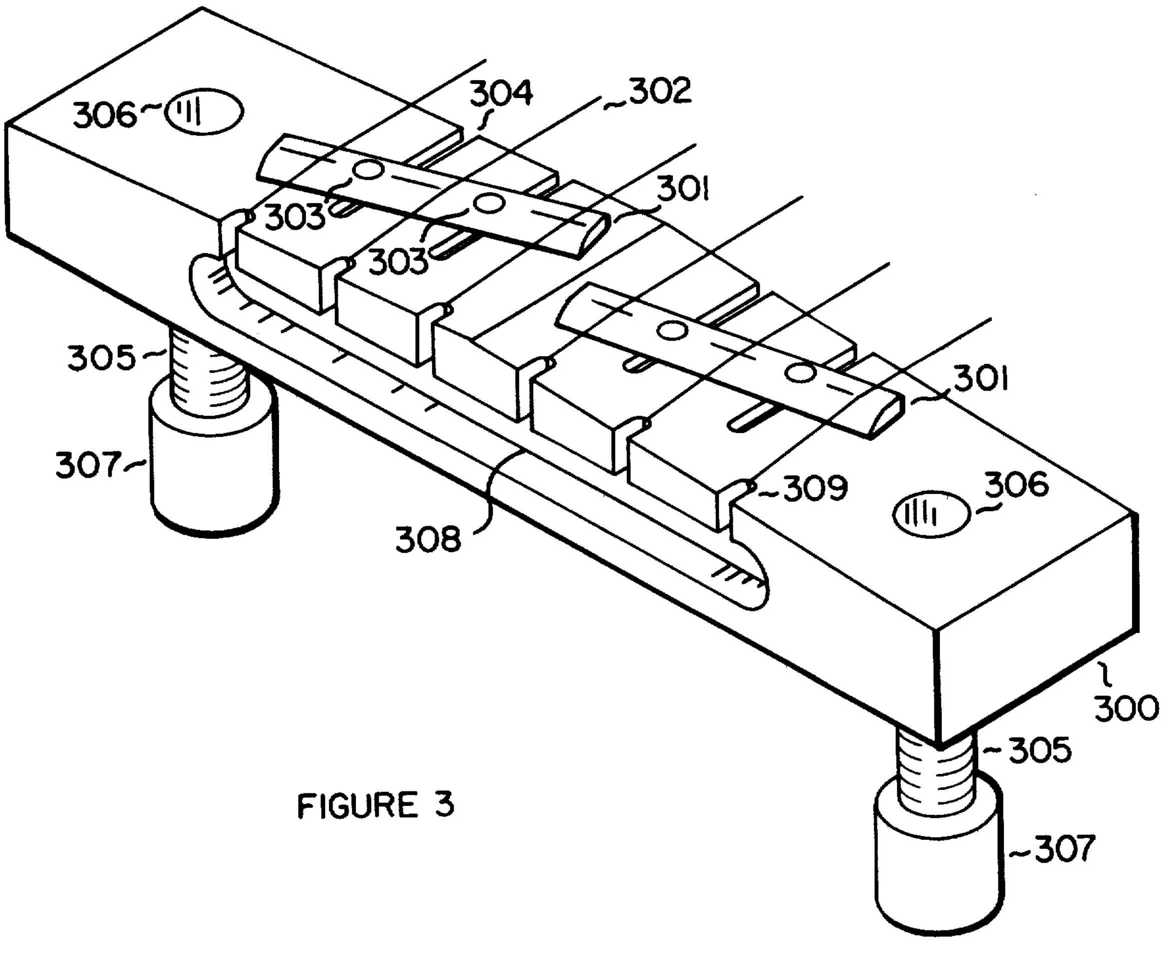
FIG. 3 is a perspective view of the non-tremolo guitar bridge.

The bridge of FIG. 3 is based on a bar 300 whose top has two sections. The two sections form linear approximations to the shape of the finger board of the instrument. The bridge supports two saddles 301 which each provide the break points for three strings 302. The saddles are fastened to the bridge with machine screws which pass through holes 303 and into nuts in slots 304. The slots 304 are Tee slots, so named for their inverted tee cross section designed to capture a nut and keep it from rotating while allowing it to slide along the length of the slot. By allowing some clearance in the slots 304 the saddle can be angled to adjust the string lengths to produce the proper pitch at all frets. The bridge is adjusted in height and angle with socket head cap screws 305 whose heads fit into counterbores of holes 306. The bridge adjustment is made by passing a standard hex wrench through holes 306 to engage the head of the cap screw. The bushings 307 are inserted into the instrument to provide hard threads.

The bridge is strung by inserting the bead string termination (not shown) into the cavity 308, bringing the string up through one of the slots 309, and across the saddles 301.

One particular advantage of this bridge design is its lack of protrusions. This is accomplished by simply rounding all of the sharp edges of the bridge. Then a player can run his hand over the bridge region without getting hooked on anything.

THE SECOND EMBODIMENT OF A TREMOLO BRIDGE

The second embodiment of a tremolo bridge combines the simplicity of the non-tremolo bridge with the pivoting bridge and the string attachment in the saddle. The design for this embodiment uses the same observation as the design of the the non-tremolo bridge: if the strings for a saddle are selected properly, the proper saddle break points will be in a line. Alternatively, the saddle break points can be designed for any predetermined selection of string types by positioning the breakpoints at their nominal positions.

The bridge 400 provides the supporting structure for the saddles 401 which are held down to the bridge by screws 402 and adjusted for position along the length of the string and for rotation over the bridge by screw 403. The screws 402 thread into nuts located in tee slots in the bridge in a manner like slots 304 in bridge 300 shown in FIG. 3. The screws 403 are free to move left and right in slots 404 so that the saddle can rotate. The saddle 401 contains three string attachment points 405 and string break points 406 similar to those detailed in FIG. 2A and described hereinabove. The saddle 401 is shaped like a wedge on sides 407 to approximate the curvature of the finger board. The saddle 401 is shaped like a parallelogram on top 408 to conform to the general slant of the nominal intonation or nominal break point positions.

The bridge also has holes countersunk to form pivots 410 which hinge on bolts whose shanks are relieved as the screw in FIG. 2B. The bushing 411 receives the tremolo bar. Components similar to lever 203 and springs 204 of FIG. 2 are not shown but nevertheless are needed.

Figure 4:
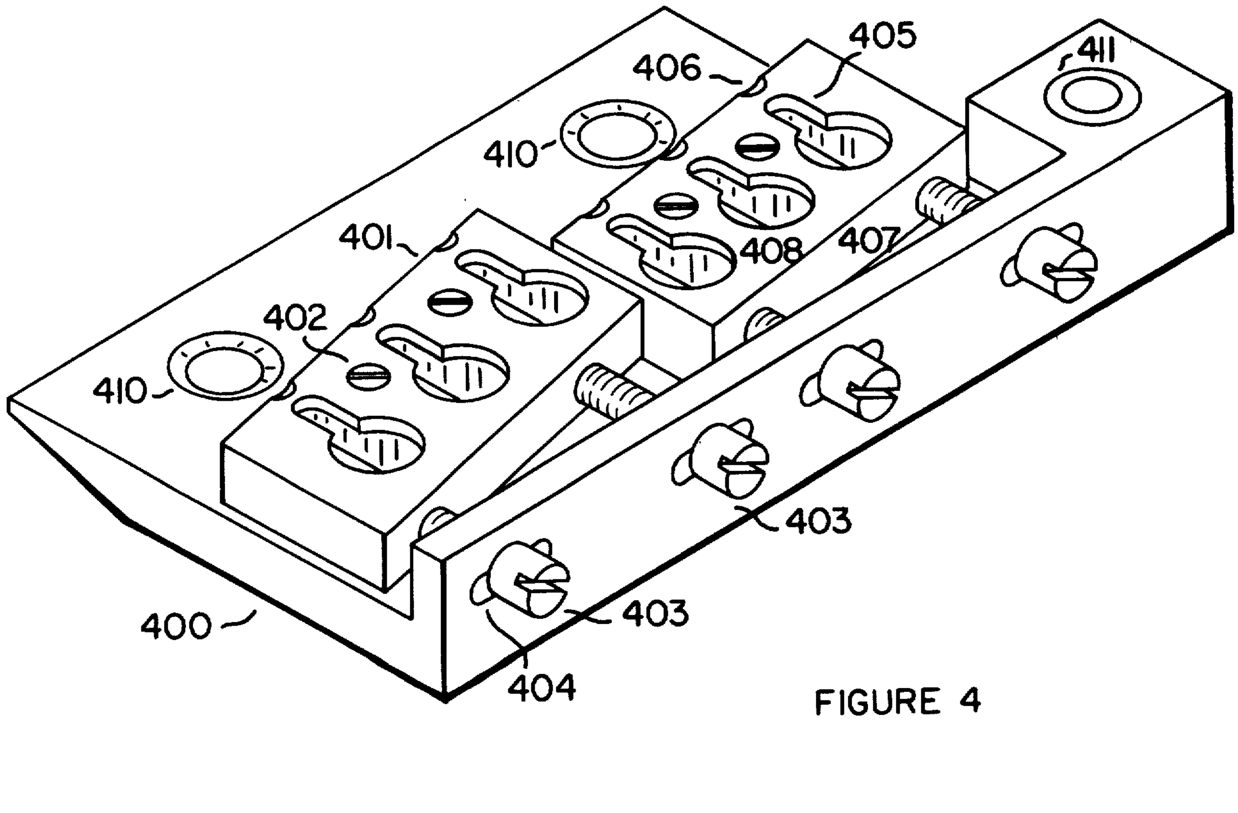
FIG. 4 is the perspective views of the second embodiment of a pocket type tremolo bridge.

Notice that the screws 303 of FIG. 3 and 402 of FIG. 4 securely fasten the saddles to their respective bridges. This solid contact makes the string support more rigid and consequently produces a greater string vibration sustain and clearer notes.

A BEAD TERMINATED STRING

All of the string attachments in the bridge or saddle use a bead terminated string that does not wrap the string on itself. The string wrapping on itself detrimentally produces an added source of friction which is avoidable by terminating the bead with a crimp or bond.

Figure 5:
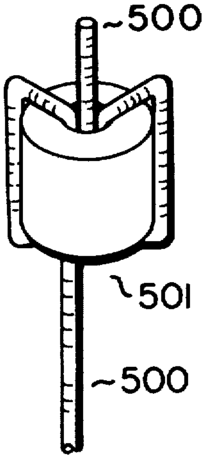
FIG. 5 is the construction of a crimped bead.

FIG. 5 illustrates such a bead. String 500 is passed through the center hole of bead 501 a plurality of times and is drawn tight. The bead then is crimped to collapse the center hole around the string. An alternative bonding method is soldering the string to the bead after wrapping.

AN IMPROVED TUNING PEG

Figure 6:
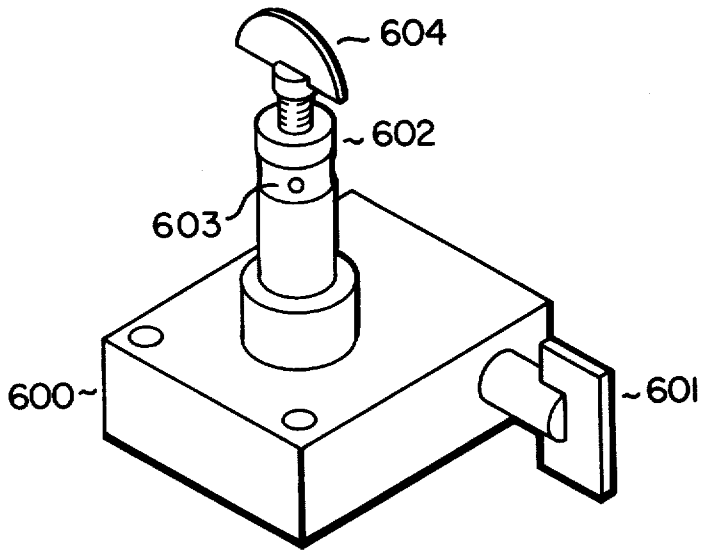
FIG. 6 is the perspective view of a tuning peg which clamps the string.

FIG. 6 depicts a standard tuning peg which has been modified to include a clamping means. The tuning peg body 600 houses a worm and worm gear and supports the two shafts protruding from it. The shaft and handle 601 are rotated by the instrument tuner so that the peg shaft 602 will alter the tension in the string. Precisely, shaft 601 rotates the worm contained in the body 601. The worm, in turn, rotates the worm gear and the tuning peg 602 at a small fraction of its rate.

Normally, the tuning peg is used by inserting the string through hole 603 and rotating the peg 602 some plurality of turns so that the string is affixed to said peg. A careful analysis of this arrangement shows that the string is not in fact held by a large friction, but is held by a medium friction. The situation is similar to that of a winch aboard ships. The cable is pulled by the winch by a friction force, not by any clamping force or gearing force, etc. As explained hereinabove, a friction force is not desirable unless it is so large that it stops all motion. Experience has shown the friction of the string against the peg is not sufficiently high to stop all motion. Since it does not stop all motion, the insufficient friction affects the pitch stability of the instrument.

The pitch stability of the instrument is improved by simply modifying the peg shaft 602 with a simple screw clamp 604. The standard tuning peg assembly is modified by drilling and tapping the peg shaft 602 down to hole 603. This allows the clamp screw 604 to clamp the string in hole 603 between itself and the bottom of the hole 603. An alternative techique is presented by Durkee, 554,057.

This whole line of thinking was rejected by Mullen in the disclosure of his aforementioned patent. Mullen asserts that any wrapping of string around a tuning peg is unacceptable. The above analysis shows that a moderate friction is acceptable providing it affects a short length of string. However, I also assert that multiple turns of string will produce a considerable friction over a significant length of string which will, as Mullen asserts, create a pitch change or instability.

When the above tuning peg is combined with a low-friction nut such as the roller nut described hereinbelow, the tuning peg can be substantially removed from said nut. With the resulting spacing, the tuning peg handles can be sized for hand operation, negating any need for tuning tools. This is a substantial advantage to the musician who wishes to alter the pitch during a performance. Tuning devices such as presented by Mullen do not have that advantage since the various tuning elements are so closely spaced.

A SECOND EMBODIMENT OF A TUNING MEANS

Figure 7:
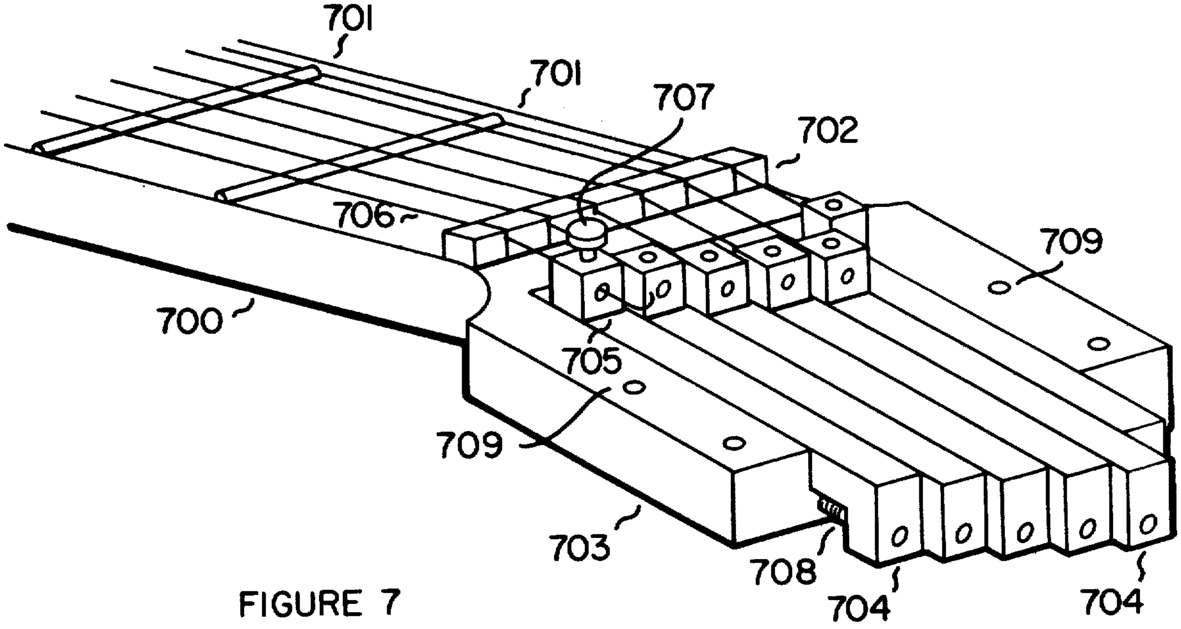
FIG. 7 is the perspective view of an alternative tuning means.

Although the first tuning means embodiment is intended to operate with a low-friction nut such as the roller nut described hereinbelow, the second embodiment, pictured in FIG. 7, is designed to operate with a more standard medium friction nut. As the friction analysis hereinabove proved, a medium friction device can be used only if the string lengths are kept short. The standard instrument head design using standard tuning devices often has several inches of string between the nut and the peg. This design places a high strength tuning member close to the nut so that the distance from the nut to the tuning device is minimized. In fact, the distance can be held to less than five eighths of an inch.

FIG. 7 shows a guitar neck 700 with frets 701 and a nut 702. A cavity is cut into the head 703 to receive a plurality of tuning members 704. Each tuning member is drilled, hole 705, to receive a string 706. Additionally, each member is drilled and tapped to receive a string clamping screw 707 and tension adjustment screw 708.

The guitar is strung by tuning the tension adjustment screws so that the tuning member can be slid towards the nut as far as it can go. Then the string is attached to the bridge or saddle, stretched across the break points at the saddle and the nut, threaded through hole 705, and clamped by screw 707. Screw 708 is then rotated to move said tuning member away from said nut to further stretch said string to the desired pitch.

A plate which is not shown is screwed down to the head by screws in holes 709. This plate improves the appearance of the instrument and captures the tuning member in the cavity in the head.

There is a wide variety of mechanical variations that can be built on the design philosophy of placing a high strength, large cross section member equipped with a string clamp close to the nut. A large cross section member will not deflect or stretch as much as a string. For example, a member with ten times the cross sectional area of the string of equal length will stretch one tenth as much assuming that they have similar elasticities. The important feature is that the member stretches or deflects much less than the string that would otherwise be there in a more standard design. If the tuning device disclosed by Mullen in his aforementioned patent were redesigned to occupy less space and were positioned significantly closer to the nut, it too could be used without the simultaneously disclosed roller nut.

Another example of such a high strength structure is a metal band attached to a tuning peg at one end and a string clamp or bead attachment means at the other. The tuning peg then pulls on the band which in turn pulls on the string. Since the band is significantly stronger than the string it does not elongate significantly. Furthermore, since the string does not need to be stretched significantly to produce the proper pitch, the band would not wrap around the peg sufficiently to produce the undesirable friction effects.

A ROLLER NUT

The roller or pulley is an excellent technique for reducing the apparent coefficient of friction. The roller is generally made of a material which resists being cut by the strings and which slides readily on a chosen shaft material. Usually, the roller is simply a cylinder grooved to receive a string and drilled to be rotated on a shaft. Unfortunately, the side forces created by string vibrations in the direction of the shaft causes the roller to move from side to side. This has two bad effects, first, it reduces the sustaining qualities of the instrument and second, it can create a definitely unmusical buzz. This roller, design corrects this deficiency.

The roller nut consists of a plurality of rollers 800 mounted in and free to rotate in housings 801 and 802. These housings are preferably molded or cast to receive the unique shaft of the roller.

Figure 8:
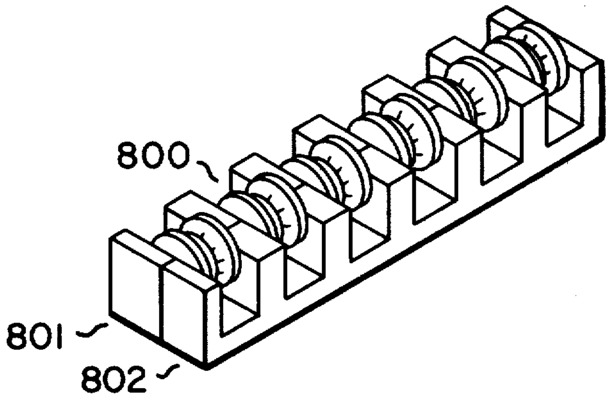
FIG. 8 is an embodiment of a roller nut.
Figure 8A:
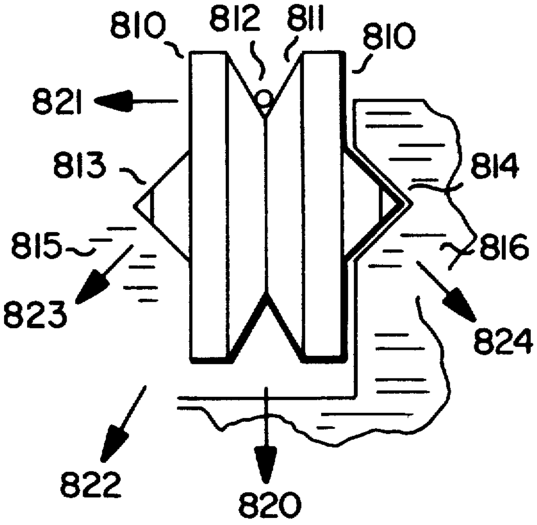
FIG. 8A is the roller with force vectors.

The roller is detailed and analyzed in FIG. 8A. The roller is a cylindrical 810 with a groove 811 to receive the string 812. Coaxial with the roller are two cones 813 and 814 which rotate in conically shaped holes in the housing 801 and 802. These cones preferably have an included angle of 90 degrees. The importance of the cones may be seen from the various arrows which represent force vectors. Arrow 820 represents the force created by the string deflection at the break point, i.e. 2*F* SIN (TN), to use some symbols defined hereinabove. Arrow 821 represents a similar force created by the side deflection of the string created by the string vibration in the plane of the strings. The vector sum of 820 and 821 is represented by arrow 822. So long as the deflection angle of the break point is sufficiently greater than the angle created by the string vibrating, the resultant vector 822 from string 812 will pass between the end points of the cones 813 and 814. These cones ride on surfaces 815 and 816 respectively. Since the cone is not attached to these surfaces and can slide over them, any force on the cone must be transmitted normally to the surface or in the direction of arrows 823 and 824. Since the string deflection angle has been designed so that the resultant vector 822 lies between the cone end points, then the vectors 823 and 824 are both positive and the roller is not forced to rotate in the plane of FIG. 8A. Of course, if the string deflection angle were insufficient, then the vector 822 would point more horizontally, pass outside of the cone tips, cause the roller to move in its journal, and create the undesirable, unmusical buzz and string damping.

The grooves in the roller should conform to the string. A straight vee groove contacts the string at two points or two lines. This allows a high stress region that is subject to significant wear. This can be fixed by forming the grooves to the circumference or shape of the string.

A HEAD DESIGN

Although the roller nut provides the optimum performance, it is complicated. Another approach is to redesign the more standard nut and instrument head so that they fall within the design guide given mathematically hereinabove. An examination of the head design is that it must provide a deflection to the string sufficient to keep the string in the grooves of the nut under various playing conditions. Experimentally 10 degrees has been found to be sufficient. This provides a TN equal to 5 degrees and a SIN (TN) of 0.0872. The nut to tuning peg string length is approximately 4 inches and the total string length is approximately 29 inches. Then by allowing half of the pitch deviation to be from the nut region, a maximum coefficient of friction for the nut may be found; it is 0.62. An examination of the *Handbook of Chemistry and Physics* produces several suitable materials that have lower coefficients of friction. For example, polyethylene and steel have a coefficient of friction of 0.2. Of course, larger deflection angles will require smaller coefficients of friction, 15 degrees will require a coefficient of 0.42. Conversely, smaller angles will permit more friction. For example, 6 degrees will permit a coefficient of friction greater than 1.0. Thus, small deflection angles will permit the use of a wide range of materials for the nut.

This head design must incorporate the tuning machine that clamps the string and therefor requires only a fractional wrap to minimize this source of medium friction.

THE ROLLER BRIDGE

The roller breakpoint may be applied to the bridge as well as the nut. The bridge assembly shown in FIG. 9 has a long string between the attachment point and the break point. A standard medium friction break point would produce pitch instability. This bridge configuration can be equipped with rollers to improve the stability.

Figure 9:
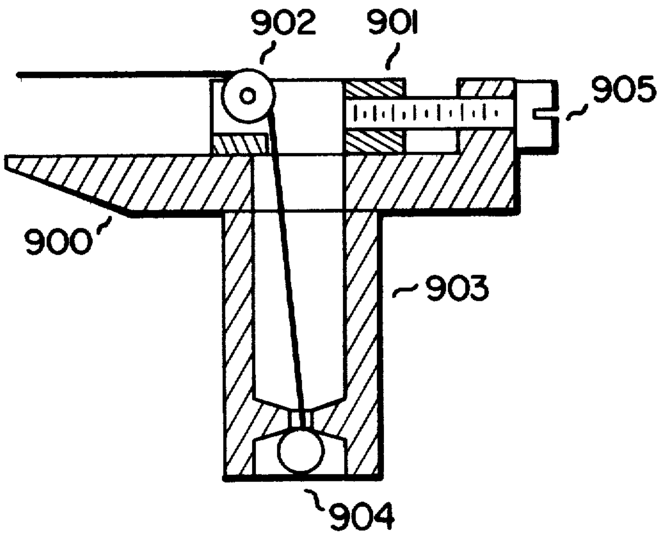
FIG. 9 is a cross section of a roller saddle.

FIG. 9 is a cross sectional view of the modified bridge showing a bridge 900, a saddle 901 equipped with roller 902, and lever 903 having a string attachment 904. Screw 905 adjusts the position of the saddle and hence the roller break point along the length of the string. Other screws which are not shown adjust the height of the saddle above the bridge to correctly position the string above the finger board of the instrument. As indicated by the analysis hereinabove a roller with its much lower friction significantly reduces the pitch instability of the instrument. Of course, the preferred roller design is the one described immediately hereinabove.

REITERATION

The pitch instability of a stringed instrument is a result of physical properties of the string support system of the instrument. Friction at the break points creates additional forces in the strings which alter the pitch of the instrument. This instability is a function of the ratio of the string length beyond the break points to the total string length, the apparent coefficient of friction, and the sine of half of the deflection angle. With these concepts and design criteria in mind a string suspension system for musical instruments was created and significant elements disclosed hereinabove. FIGS. 2 and 4 depict a saddle adjustable in position with respect to the bridge which captures the bead of a string. This design significantly shortens the length of the string between the break point and the attachment point to make the instrument more pitch stable. FIG. 3 shows another style of bridge which has a relatively low deflection angle and has a fairly short attachment-to-break-point distance. FIG. 5 shows the the bead termination of the string which is needed by the above bridge and saddle designs. FIG. 6 shows a standard tuning peg or tuning machine which has been modified to clamp the string. This avoids the otherwise necessary multiple wraps of string around the peg and the consequential detrimental string length and friction. FIG. 7 shows an alternative tuning device which keeps the string length from the string clamp to the nut short, an impossibility with the tuning pegs of FIG. 6. FIG. 8 shows an improved roller nut and roller therefor. This roller is significantly more stable in its journal than the prior art rollers which rotated on cylindrical shafts. FIG. 9 shows how this roller can be used to advantage at the other end of the string by overcoming a design fault with a lower friction. Although the roller nut is best, the standard nut, if made from the proper materials and mounted on the properly shaped head, can provide acceptable results without being as complex. Although one skilled in the art could create different versions of the above disclosures, limits of this invention are only in the claims below.

I claim:

1. A string suspension system for a stringed instrument having at least one string with first and second ends and a string suspension system support structure including: first and second attachment means defining two attachment points on said structure for respectively attaching said first and second ends of said string to said structure, first and second string breaking points between and adjacent to respective attachment points, and a bridge, the improvement comprising the length of the string between the various elements of said string suspension system being defined by the following dimensional criterion: that the length represented by one and one-half percent of the length of the string from the first attachment point to the second attachment point exceeds the sum of a first product and a second product; wherein said first product is the product of the length of string from said first string attachment point to said second string break point, the coefficient of friction of said string against said first break point, and the sine of one half of the string deflection angle at said first break point; and wherein said second product is the product of the length of string from said second string attachment point to said second string break point, the coefficient of friction of the string against said second string break point, and the sine of one half of the string deflection angle at said second string break point; wherein said coefficient of friction for said break points is the ratio of the force required to move the string past the break point to the force applied to the break point by the tension in said string; and said bridge includes saddles having said first string breaking point and said first string attachment means thereon.

2. The string suspension system of claim 1 wherein said second attachment means further includes a tuning means having a means for clamping the string which said tuning means is to tune.

3. The string suspension system and tuning means of claim 2 wherein said structure produces a string deflection angle at said second breakpoint of less than 10 degrees.

4. The string suspension system of claim 1 which further includes a roller at a string break point to reduce the coefficient of friction.

5. The string suspension system of claim 1 wherein each of said saddles having a plurality of strings thereon, each of which has a break point on said saddle.

6. The string suspension system and bridge of claim 5 wherein said saddles includes said first string attachment means for attaching said strings thereto.

7. The string suspension system and bridge of claim 5 wherein said bridge includes said first string attachment means thereon for attaching said strings thereto.

8. In a string suspension system for a stringed instrument including at least one string having a first and second ends attached to the string suspension system support structure of said instrument; first and second string attachment means on said structure defining a first and second attachment points for attaching the first and second ends of said string to said structure; a string breaking point between said first and second string attachment points; and a bridge, the improvement comprising the length of string between various elements of said suspension system being defined by: one and one-half percent of the length of the string against said breaking point, and the sine of one-half of the string deflection angle at said break point; wherein said coefficient of friction for said break point is the ratio of the force required to move said string past said break point to the force applied to said break point by the tension in said string; and said bridge includes a plurality of saddles, each of which having a plurality of break points.

9. The string suspension system of claim 8 which includes a tuning means on said structure with a means for clamping the said second string end which said tuning means is to tune.

10. The string suspension and tuning means of claim 9 wherein said support structure produces a string deflection angle at said second deflection point of less that 10 degrees.

11. The string suspension system of claim 8 which includes a string break point improved by a roller to reduce said coefficient of friction.

12. The string suspension system and bridge of claim 8 wherein said saddles also have the string attachment means for said first string ends.

13. The string suspension system and bridge of claim 8 wherein said bridge also has the string attachment means for said first string ends.

14. A string suspension system for a stringed instrument having a string suspension support structure and for supporting and tensioning a plurality of strings having first and second ends, said string suspension system including a first attachment means for attaching the first end of said strings to said structure; a tuning means on said structure which clamps at least one of said plurality of strings; a medium friction nut between said first end and said tuning means so that the length of the string from said tuning means to said nut is less than four percent of the distance from said first attachment means to said second attachment means; and a bridge having a plurality of saddle means, said saddle including means for attaching said first end of said string.

15. The string suspension system of claim 14 which also includes a bridge which includes said first string attachment means; and a saddle mounted on said bridge, said saddle further including a string breaking point, wherein the length of string from said first attachment means to said breaking point is less that four percent of the distance from said first attachment means to said second attachment means.

16. The string suspension system of claim 15 wherein said string attachment means is adapted to receive strings terminated with a bead affixed to said string.

17. The string suspension system of claim 14 wherein said saddle includes means for adjusting its height above said bridge.

18. The string suspension system of claim 14 wherein said saddle and said bridge includes means for adjusting the saddle position along the longitudinal axis of said strings.

19. The string suspension system of claim 14 which also includes a bridge element having a plurality of saddles, each of said saddles supporting a plurality of strings, and having an adjustment means thereon for positioning said saddle along the longitudinal axis of said strings.

20. The string suspension system of claim 14 which includes a bridge element having a plurality of saddles, each of said saddles having a roller to create a saddle break point with low friction.

21. A bridge element of a string suspension system for a stringed instrument having a plurality of strings comprising a plurality of saddle means on said bridge, each of said saddle means including a string breaking point thereon and means thereon for attaching a string terminated with a bead at a point displaced from said breaking point.

22. The bridge element of claim 21 wherein said saddle means further includes a height adjustment means for adjusting the height of the string above said bridge.

23. The bridge element of claim 21 further including a length adjusting means attached to said bridge for adjusting the position of said saddle means along the length of the string.

24. The bridge element of claim 21 which further includes a clamping means for clamping said saddles to eliminate any motion perpendicular to said string.

25. The bridge element of claim 21 which further includes a pivoting means to attach said bridge to said instrument for permitting the bridge to rotate around the pivot axis of said pitoting means which is between said strings and said instrument and approximately perpendicular to said strings.

26. The bridge element of claim 25 which further includes a spring means attached to said bridge and the structure of said instrument for providing a force to counter the force placed upon said bridge by said strings.

27. The bridge element of claim 25 which further includes an arm means attached to said bridge to alter the angular position of said bridge around said pivoting axis.

28. The bridge element of claim 27 wherein said arm means is attached to said bridge by sliding said arm in a hole in said bridge.

29. The bridge element of claim 28 which further includes a friction producing means for impeding the rotation of said arm in said hole.

30. The bridge element of claim 21 wherein said saddle has a string breaking point and said breaking point is less than one inch from said attachment point.

31. The bridge element of claim 21 wherein said saddle includes a roller as said breaking point.

32. A bridge element of a string suspension system for a stringed instrument having a plurality of strings comprising at least two saddle means mounted on said bridge, at least one of said saddle means supporting a plurality of strings, and having adjustment means attached thereto for individually positioning said saddle along the length of said strings and for adjusting the angle that said saddle makes with the axis of said strings in the plane of said strings.

33. The bridge element of claim 32, wherein said saddle is in the approximate shape of the fingerboard of said instrument and said bridge contains tee slots to accomodate the adjustement of the saddles along the length of the string.

34. The bridge element of claim 32 wherein the height of said strings above said bridge is fixed.

35. The bridge element of claim 32 which further includes attachment means connected to said bridge for attaching said bridge to said instrument and said attachment means permitting the adjustment of the height of the bridge above said instrument.

36. The bridge element of claim 32 wherein said saddle further includes string attachment means for attaching the first end of strings terminiated with a bead to said saddle.

37. The bridge element of claim 32 wherein said saddle includes a roller thereon for supporting a string.

38. The bridge element of claim 32 which further includes a pivoting means to attach said bridge to said instrument for permitting the bridge to rotate around the pivot axis of said pitoting means which is between said strings and said instrument and approximately perpendicular to said strings.

39. The bridge element of claim 38 which further includes a spring means attached to said bridge and the structure of said instrument for providing a force to counter the force placed upon said bridge by said strings.

40. The bridge element of claim 38 which further includes an arm means attached to said bridge to alter the angular position of said bridge around said pivoting axis.

41. The bridge element of claim 40 wherein said arm means is attached to said bridge by sliding said arm in a hole in said bridge.

42. The bridge element of claim 41 which further includes a friction producing means for impeding the rotation of said arm in said hole.

43. For a stringed instrument having a plurality of strings with first and second ends supported by a string suspension system, a string suspension system having a bridge which has at least two saddles mounted on said bridge, said saddles supporting a plurality of strings, and having an adjustment means attached thereto for individually positioning said saddles along the length of said strings and for adjusting the angle that said saddle makes with the axis of said strings in the plane of said strings.

44. A string suspension system of claim 43 further including a low-friction nut mounted on said instrument and a rotating tuning peg mounted on said instrument wherein said tuning peg clamps one of said plurality of strings.

45. The string suspension system of claim 44 wherein said low-friction nut includes a roller for supporting at least one of a plurality of strings and for rotating with the motion of the string across said nut.

46. The string suspension system of claim 43 which further includes a plurality of saddles, each including a roller to create a saddle breaking point with low friction.

47. The string suspension system of claim 43 which further includes a medium friction nut on said instrument and wherein said bridge includes a first attachment means for attaching said first end of said strings to said bridge, said saddle includes a string breaking point for at least one string and said suspension system includes a second string attaching means mounted to said instrument for attaching said second end of said strings to said instrument wherein the length of string from said first attachment means to said breaking point plus the length of string from said nut to said second attachment means is less that four percent of the distance from said first attachment means to said second attachment means.

48. The string suspension system of claim 47 wherein said first string attachment means is adapted to receive said first end of said strings terminated with a bead.

49. The string suspension system of claim 43 wherein said bridge includes a plurality of saddles wherein each saddle includes means for attaching a string thereto.

50. A stringed musical instrument having at least one string, a string suspension system, and a string suspension support structure, wherein said suspension system comprises: a rotating tuning peg including a string clamping means mounted on said structure; a bridge having at least one saddle mounted thereon; a low-friction nut on said structure between said rotating tuning peg and said saddle; the saddle being adjustable along the longitudinal axis of the string and including a string breaking point and a string attachment means for a string terminated in a bead at a point displaced from said breaking point; and a hole in said bridge for receiving a tremelo arm by sliding said tremolo arm into said hole.

51. The stringed musical instrument of claim 50 wherein said low-friction nut is a roller nut.

52. The stringed musical instrument of claim 50 wherein said saddle is also adjustable in height above said bridge to adjust the height of the strings above the structure of said instrument.

53. The stringed musical instrument of claim 50 wherein said bridge is adjustable in height with respect to the structure of said instrument to adjust the height of the strings above the structure of said instrument.

54. The stringed musical instrument of claim 50 wherein said bridge contains a friction device to impede the rotation of said tremolo arm in said hole.

55. A stringed musical instrument having a plurality of strings, a string suspension system, and a string suspension system support structure; wherein said suspension system comprises: a tuning peg with a string clamping means mounted on said structure; a bridge having a string attachment means thereon and a plurality of saddles thereon, said saddle providing a break point thereon for at least one string, and means for positioning said saddle at an angle relative to the longitudinal axis of said string in the plane of said saddle; and a low-friction nut on said body between said bridge and said tuning peg.

56. The stringed musical instrument of claim 55 wherein said low-friction nut contains rollers.

57. The stringed musical instrument of claim 53 wherein each saddle includes break points for a plurality of strings.

58. A stringed musical instrument having a plurality of strings, a string suspension system, and a string suspension system support structure; wherein said suspension system comprises: a tuning peg with a string clamping means mounted on said structure; a bridge having a string attachment means thereon and a plurality of saddles thereon, said saddle providing a break point thereon for at least one string, and means for positioning said saddle at an angle relative to the longitudinal axis of said string in the plane of said saddle; and a nut on said structure between said bridge and said tuning peg and wherein said structure produces a string deflection angle at said nut of less than 10 degrees.

59. The stringed musical instrument of claim 58 wherein each saddle includes break points for a plurality of strings.

60. The stringed musical instrument of claim 58 wherein said nut has a coefficient of friction with respect to said strings of less than 1.0.

61. A stringed musical instrument having at least one string, a string suspension system, and a string suspension system support structure, wherein said suspension system comprises: a rotating tuning peg including a string clamping means mounted on said structure; a bridge having at least one roller saddle mounted thereon; a low friction nut on said structure between said rotating tuning peg and said saddle; a string extending from said tuning peg across said low friction nut and roller saddle and terminating on said bridge and having a deflection angle at said low friction nut, of less than 10 degrees.

62. The stringed musical instrument of claim 61 wherein said saddle is also adjustable in height above said bridge to adjust the height of the strings above the structure of said instrument.

63. The stringed musical instrument of claim 61 wherein said bridge is adjustable in height with respect to the structure of said instrument to adjust the height of the strings above the structure of said guitar.

64. The stringed musical instrument of claim 61 wherein said bridge is equipped with a hole to receive a tremolo arm by sliding said tremolo arm into said hole.

65. The stringed musical instrument of claim 61 wherein said bridge contains a friction device to impede the rotation of said tremolo arm in said hole.

66. The stringed musical instrument of claim 61 wherein said nut has a coefficient of friction with respect to said strings of less than 1.0.

67. The stringed musical instrument of claim 61 wherein said saddle is adjustable along the longitudinal axis of said string.

* * * * *